Aug. 11, 1959   R. G. MICHEL   2,899,245
FLOODED BEARING SEAL FOR GAS-FILLED MACHINES
Filed April 26, 1954

Inventor
Robert G. Michel
By Steve W. Gremban
Attorney

United States Patent Office 2,899,245
Patented Aug. 11, 1959

2,899,245

FLOODED BEARING SEAL FOR GAS-FILLED MACHINES

Robert G. Michel, Milwaukee, Wis., assignor to Allis-Chalmers Manufacturing Company, Milwaukee, Wis.

Application April 26, 1954, Serial No. 425,553

2 Claims. (Cl. 308—36.3)

This invention relates generally to seal means for gas-filled machines having a housing and a movable shaft extending through the housing for sealing the shaft to the housing to prevent loss of gas through the clearance space between the stationary housing and the shaft, and more specifically to a bearing flooded with pressurized lubricant to form a seal in a gas-filled machine to prevent loss of gas from the housing of the machine and to prevent ingress of air into the housing.

In gas-filled machines, such as generators and electric motors, a gas such as hydrogen is used principally for cooling purposes. Leakage of gas out of the gas-filled machine or leakage of air into the machine reduces the cooling efficiency of the gas by diluting the gas. The gas leakage may also be dangerous particularly where hydrogen is used since an air-hydrogen mixture may be explosive depending on the percentage of air present. Heretofore, seals have been provided sealing the housing of the machine to the shaft to prevent gas leakage through the clearance space between the housing and the shaft and to prevent air entering the housing. The nature of the present invention resides in an improved seal for a gas-filled machine in which a bearing is flooded with lubricant at a pressure greater than atmospheric pressure to lubricate the bearing and to provide a seal between the bearing and the shaft. The lubricant should be supplied to the bearing at a sufficient pressure to produce a solid film of lubricant in the clearance space between the bearing and the shaft with a portion of the film of lubricant moving in a direction opposite to the attempted flow of gas out of the housing. The pressure should further be sufficient to provide a solid ring of lubricant around a portion of the shaft.

It is therefore an object of the present invention to provide a bearing flooded with pressurized lubricant in which the lubricant used to lubricate the bearing provides a seal between a housing and a shaft of a gas-filled machine.

Another object of the invention is to provide a seal which requires less shaft space than prior known seals.

Another object of the invention is to provide a seal that is simple, compact and more economical than prior known seals.

Figure 1:
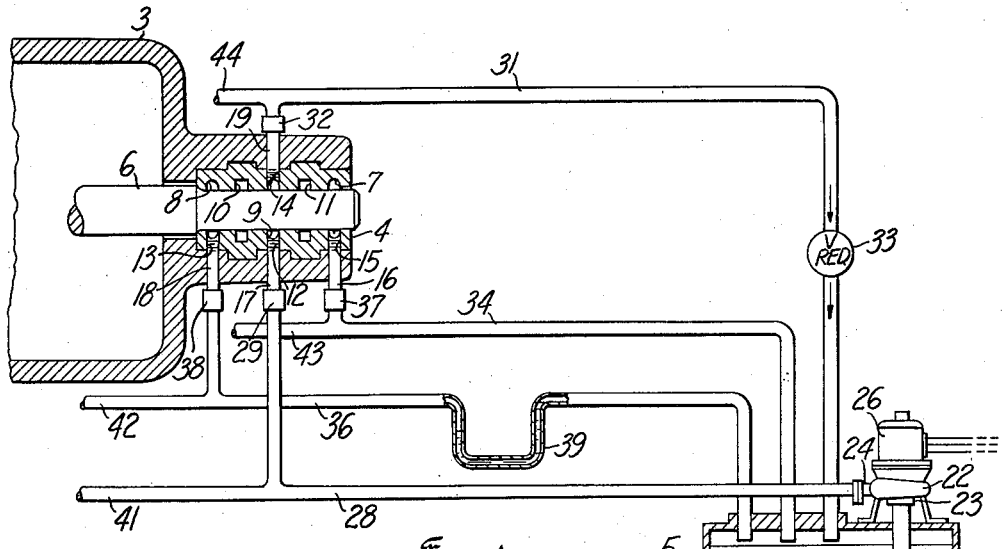
Figure 2:
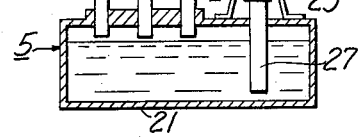
Figure 2:
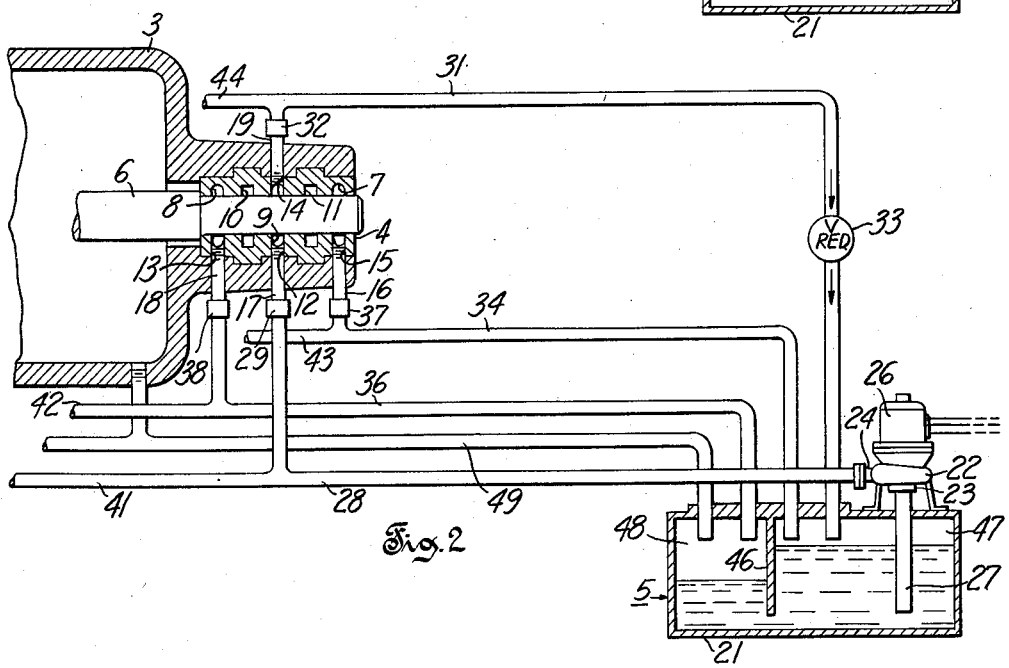

Objects and advantages other than those set forth above will be apparent from the following description when read in connection with the accompanying drawing, in which:

Fig. 1 is a view partly in elevation and partly in section of a lubricant system including a seal embodying the invention in which only a fragment of the housing is shown; and Fig. 2 is a view similar to Fig. 1 having a modified lubrication system.

As shown in the drawing, this invention is illustrated in Figs. 1 and 2 as applied to a gas-filled machine having a housing 3, a bearing 4 mounted in gas tight relation to the housing in a bearing support shown as the housing 3, a shaft 6 rotatable about a longitudinal axis journaled in the bearing 4 and a lubrication system shown generally at 5 for supplying lubricant to the bearing 4.

In the housing 3, all the structural details of the machine not essential to an understanding of the invention have been omitted, and the housing only partially shown. The housing 3 may be any type of gas-filled housing for machines such as electric motors and generators.

The bearing 4 mounted in the housing may be any well known suitable type of bearing for gas-filled machines. The bearing 4 may be constructed of solid bearing material such as cast iron, or may be constructed of two parts of different metals such as a cast iron bearing support having a bearing sleeve of babbitt, brass, bronze or some other suitable bearing material. Bearings of this type may be one piece or solid bearings or they may be of any other well known construction such as two piece or split bearings which are usually divided along a line of least pressure. The bearing 4, shown in Figs. 1 and 2 as a solid one piece bearing, has an axial opening centrally disposed therethrough into which the shaft 6 is journaled and has a diameter slightly larger than the diameter of the shaft 6 to provide clearance therebetween to allow for expansion of the parts due to temperature and to allow sufficient space for the entrance of lubricant.

The surface of the bearing 4 that engages the shaft 6 defines first and second annular grooves 7, 8 adjacent each end of the bearing 4. Intermediate the grooves 7, 8, the surface of the bearing 4 that engages the shaft 6 defines an annular passageway 9 which constitutes an oil feeding inlet portion for the bearing 4, although the passageway 9 need not be annular. Interposed axially between the passageway 9 and the grooves 7, 8, respectively, are first and second annular channels 10, 11, although only one of the channels would be sufficient. The annular channels 10, 11 when full of lubricant provide solid rings of lubricant surrounding the shaft 6 to flood the shaft with lubricant. When an annular passageway 9 is used and the lubricant introduced into the bearing at a pressure sufficient to form a solid moving film of lubricant in the clearance space between the shaft 6 and the bearing 4, the annular channels 10, 11 may be eliminated completely.

A plurality of openings 12, 13, 14 and 15 pass through the housing and the bearing into communication with the grooves 7, 8 and passageway 9. A portion of each of the openings 12, 13, 14 and 15 passing through the bearing 4 is threaded. A plurality of tubes 16, 17, 18 and 19 have their ends threaded, and each tube has one of the threaded ends screwed tightly into the threaded portion of the complementary openings 12, 13, 14 and 15.

The lubrication system 5 comprises a sump tank or reservoir 21 for storing suitable lubricant such as oil. An oil pump shown as a centrifugal pump 22 although any other suitable type of pump may be used, is positioned on the reservoir 21. The centrifugal pump 22 has a suction intake 23 and a casing 24 and is driven by driving means shown as an electrical motor 26 although any other suitable driving means may be used. The centrifugal pump 22 has a pipe 27 having one end communicating with the lubricant in the reservoir 21 and the other end connected to the centrifugal pump suction intake 23. A first conduit 28 connects the casing 24 of the centrifugal pump 22 to the tube 17 leading into the annular passageway 9 of the bearing 4 to supply lubricant from the pump 22 to the bearing 4. The conduit 28 is connected to the tube 17 by means of any suitable connecting means well known in the art shown as a pipe coupling 29. A return second conduit 31 connects the tube 19 leading into the annular passageway 9 to the reservoir 21 to return surplus lubricant thereto. A pipe coupling 32 connects the return conduit 31 to the tube 19. Means are provided in the return conduit 31, shown as a reducing valve 33, although any other suitable means may be used, to provide a back pressure in the bearing 4. The lubricant pressure in the bearing which is maintained at a value greater than atmospheric causes the lubricant being fed into the annular passageway 9 of the bearing 4 to move axially in each direction along the shaft 6 into the clearance provided between the bearing 4 and the shaft 6 and into the annular channels 10, 11. Third and fourth conduits 34, 36, respectively, connect the tubes 16, 18, respectively, leading into the annular grooves 7, 8 of the bearing 4. Pipe couplings 37, 38 connect the return conduits 34, 36 to the tubes 16, 18. A trap is interposed in the second passageway that extends from the second groove 8 to the first groove 7 by way of the fourth conduit 36, the reservoir 21, and the third conduit 34, but preferably the trap 39 shown as a U-shaped conduit is interposed in conduit 36, although any other type of suitable trap, one of which is shown in Fig. 2, may be used. The trap 39 prevents the gas that passes from the housing into conduit 36 from passing through the reservoir 21 to atmosphere. The oil level of the gas side of trap 39 is depressed by the gas pressure in preventing the escape of the gas.

Also, although means are shown for supplying lubricant to only one bearing 4, other means comprising conduits 41, 42, 43 and 44 are provided to supply lubricant to other bearings (not shown) mounted in the machine.

In Fig. 2, a lubrication system is shown which eliminates the necessity of the trap 39 shown in Fig. 1. In this system, parts identical to the parts shown in Fig. 1 are designated by the same numerals. In Fig. 2, a baffle plate 46 is interposed in the reservoir 21 and secured to the top and sides of the reservoir 21 to divide the reservoir into first and second compartments 47, 48 that are communicable through the opening defined by the bottom of the baffle plate 46 and the sides and bottom of the reservoir 21. A fifth gas conduit 49 connects the housing 3 to the compartment 48 to maintain a gas pressure within that compartment at the same value as the gas pressure within the housing 3 of the machine. The remainder of the system is similar to the system shown in Fig. 1 with the exception that conduit 36 does not have a trap 39 interposed therein. The conduit 49 is connected to the gas pressurized compartment 48 to provide a closed gas path comprising the housing 3, groove 8, tube 18, conduit 36, compartment 48 and conduit 49. The gas is prevented from escaping to atmosphere by the lubricant in compartment 48 which is depressed by the gas pressure in the gas path.

In operation, the electric motor 26 is energized from a power source (not shown) to drive the centrifugal pump 22. Lubricant from the reservoir 21 is drawn through the pipe 27 into the pump 22 and discharged from the pump 22 through conduit 28 to the passageway 9 of the bearing 4. Excess lubricant from the bearing 4 is returned to the reservoir 21 through conduit 31. The lubricant is forced into the clearance space between the shaft 6 and the bearing 4 and into the annular channels 10, 11 at a suitable pressure greater than atmospheric pressure regulated by the reducing valve 33 to lubricate the bearing 4 and to provide a seal between the bearing 4 and the shaft 6. Lubricant which is forced by the pressure from the passageway 9 axially outward along the shaft 6 is received by the annular grooves 7, 8 and returned to the reservoir 21 through tubes 16, 18 and conduits 34, 36. The moving film of lubricant in the clearance space between the shaft 6 and the bearing 4 and the annular channels 10, 11 flooded with lubricant provide a seal against gas leakage from the housing 3. Any gas reaching the annular groove 8 is prevented from axially entering further into the clearance space by the solid moving film of lubricant. Any gas leaking axially past the groove 8 is prevented from further axial movement by the solid ring of lubricant in channel 10 surrounding the shaft 6. The gas reaching the groove 8 passes into conduit 36 where some of the gas is absorbed by the lubricant. The remaining gas is prevented from leaking to atmosphere by the trap 39 in Fig. 1 and the lubricant in compartment 48 in Fig. 2.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. The combination with a machine provided with a housing adapted to be filled with a gas under pressure and a movable member within said housing having a shaft extending outwardly through said housing to atmosphere, of a lubricant system, said lubricant system comprising: a bearing mounted in gas tight relation to said housing and having said shaft journaled therein; the surface of said bearing engaging said shaft defining first and second annular grooves, said first groove surrounding said shaft at one end of said bearing and being exposed to atmosphere, said second groove surrounding said shaft at the other end of said bearing and being exposed to said pressurized gas in said housing; said surface of said bearing defining an annular passageway positioned intermediate said first and second annular grooves for directing lubricant into said bearing; said surface of said bearing defining at least one annular channel positioned intermediate said first and second grooves for receiving lubricant to provide a solid ring of lubricant surrounding said shaft; a reservoir; a pump arranged to draw lubricant from said reservoir; a first conduit connecting the outlet of said pump to said annular passageway to provide lubricant thereto; a second conduit connecting said bearing to said reservoir to return excess lubricant thereto; means connected to said second conduit for providing lubricant pressure in said bearing of a value greater than atmospheric pressure; a third conduit connecting said first groove to said reservoir to return lubricant that has passed axially along said shaft from said annular passageway to said first groove; a fourth conduit connecting said second groove to said reservoir to return lubricant that has passed axially along said shaft from said annular passageway to said second groove, said second groove being connected to said first groove through a second passageway including said fourth conduit, said reservoir and said third conduit, said lubricant in passing axially along said shaft from said annular passageway to said first and second grooves completely filling said annular channel therebetween with lubricant and further forming a moving lubricant film to form a seal between said bearing and said shaft, said lubricant absorbing a part of said gas in said housing attempting to leak through said seal; a trap interposed in said fourth conduit to prevent the remainder of said gas from passing to atmosphere, said trap comprising a U-shaped column of lubricant, the portion of said column of lubricant nearest said second groove being depressed by said gas pressure within said housing while preventing said remainder of said gas from passing into said reservoir.

2. The combination with a machine provided with a housing adapted to be filled with a gas under pressure and a movable member within said housing having a shaft extending outwardly through said housing to atmosphere, of a lubricant system, said lubricant system comprising: a bearing mounted in gas tight relation to said housing and having said shaft journaled therein; the surface of said bearing engaging said shaft defining first and second annular grooves, said first groove surrounding said shaft at one end of said bearing and being exposed to atmosphere, said second groove surrounding said shaft at the other end of said bearing and being exposed to said pressurized gas in said housing; said surface of said bearing defining first and second annular channels positioned intermediate said grooves with said first channel adjacent said first groove and said second channel adjacent said second groove for receiving lubricant to provide solid rings of lubricant surrounding said shaft; said surface of said bearing defining an annular passageway positioned intermediate said annular channels for directing lubricant into said bearing; a reservoir; a pump arranged to draw lubricant from said reservoir; a first conduit connecting the outlet of said pump to said annular passageway to provide lubricant thereto; a second conduit connecting said bearing to said reservoir to return excess lubricant thereto; means connected to said second conduit for providing lubricant pressure in said bearing of a value greater than atmospheric pressure; a third conduit connecting said first groove to said reservoir to return lubricant that has passed axially along said shaft from said annular passageway to said first groove; a fourth conduit connecting said second groove to said reservoir to return lubricant that has passed axially along said shaft from said annular passageway to said second groove, said second groove being connected to said first groove through a second passageway including said fourth conduit, said reservoir and said third conduit, said lubricant in passing axially along said shaft from said annular passageway to said first and second grooves completely filling said annular channels therebetween with lubricant and further forming a lubricant film to form a seal between said bearing and said shaft, said lubricant absorbing a part of said gas in said housing attempting to leak through said seal; a trap interposed in said fourth conduit to prevent the remainder of said gas from passing to atmosphere, said trap comprising a U-shaped column of lubricant, the portion of said column of lubricant nearest said second groove being depressed by said gas pressure within said housing while preventing said remainder of said gas from passing into said reservoir.

References Cited in the file of this patent

UNITED STATES PATENTS

| | | |
|---|---|---|
| 1,754,904 | Ray | Apr. 15, 1930 |
| 1,759,074 | Van Rijswijk | May 20, 1930 |
| 1,840,127 | Penney | Jan. 5, 1932 |
| 2,159,057 | Sterrett | May 23, 1939 |
| 2,253,350 | Ross et al. | Aug. 19, 1941 |
| 2,526,594 | Voysey | Oct. 17, 1950 |
| 2,650,116 | Cuny | Aug. 25, 1953 |
| 2,721,747 | Whitfield | Oct. 25, 1955 |